(12) United States Patent
Djenguerian et al.

(10) Patent No.: US 10,177,666 B2
(45) Date of Patent: Jan. 8, 2019

(54) METHOD AND APPARATUS FOR SENSING MULTIPLE VOLTAGE VALUES FROM A SINGLE TERMINAL OF A POWER CONVERTER CONTROLLER

(71) Applicant: Power Integrations, Inc., San Jose, CA (US)

(72) Inventors: Alex B. Djenguerian, Saratoga, CA (US); Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/877,084

(22) Filed: Jan. 22, 2018

(65) Prior Publication Data

US 2018/0145597 A1 May 24, 2018

Related U.S. Application Data

(63) Continuation of application No. 15/363,744, filed on Nov. 29, 2016, now Pat. No. 9,912,242, which is a
(Continued)

(51) Int. Cl.
*H02M 3/335* (2006.01)
*H02M 3/24* (2006.01)
(Continued)

(52) U.S. Cl.
CPC ......... *H02M 3/33507* (2013.01); *H02M 1/08* (2013.01); *H02M 3/24* (2013.01);
(Continued)

(58) Field of Classification Search
CPC .......... H02M 1/4208; H02M 3/33507; H02M 3/33523; H02M 3/335; H02M 3/33569; H02M 7/48; Y02B 70/126
(Continued)

(56) References Cited

U.S. PATENT DOCUMENTS 4,849,869 A 7/1989 Tanuma et al.
5,359,281 A 10/1994 Barrow et al.
(Continued)

FOREIGN PATENT DOCUMENTS

CN 1038914 A 1/1990
CN 1489272 A 4/2004
(Continued)

OTHER PUBLICATIONS

Texas Instruments, UCC28600, 8-Pin Quasi_Resonant Flyback Green-Mode Controller, www.ti.com, SLUS646C, Nov. 2005, Revised Feb. 2007, pp. 1-25.
(Continued)

*Primary Examiner* — Adolf Berhane
(74) *Attorney, Agent, or Firm* — Christensen O'Connor; Johnson Kindness PLLC

(57) ABSTRACT

A method for regulating an output of a power converter includes receiving a signal from an auxiliary winding of an energy transfer element of the power converter. The energy transfer element includes an input winding coupled to an input of the power converter, an output winding coupled to the output of the power converter, and the auxiliary winding. The signal represents a line input voltage of the power converter during at least a portion of an on time of a power switch coupled to the input winding. The signal represents an output voltage of the power converter during at least a portion of an off time of the power switch. The power switch is switched in response to the signal to regulate the output of the power converter.

4 Claims, 5 Drawing Sheets

Related U.S. Application Data continuation of application No. 14/880,481, filed on Oct. 12, 2015, now Pat. No. 9,543,840, which is a continuation of application No. 14/313,447, filed on Jun. 24, 2014, now Pat. No. 9,166,479, which is a continuation of application No. 13/777,438, filed on Feb. 26, 2013, now Pat. No. 8,773,871, which is a continuation of application No. 13/279,157, filed on Oct. 21, 2011, now Pat. No. 8,406,013, which is a continuation of application No. 12/058,530, filed on Mar. 28, 2008, now Pat. No. 8,077,483.

(60) Provisional application No. 60/922,133, filed on Apr. 6, 2007.

(51) Int. Cl.
  *H02M 1/08* (2006.01)
  *H02M 1/32* (2007.01)
  *H02M 1/36* (2007.01)
  *H02M 1/00* (2006.01)

(52) U.S. Cl.
  CPC .......... *H02M 3/33523* (2013.01); *H02M 1/32* (2013.01); *H02M 1/36* (2013.01); *H02M 2001/0009* (2013.01)

(58) Field of Classification Search
  USPC .............................. 363/20, 21.01, 78, 95, 97
  See application file for complete search history.

(56) References Cited

U.S. PATENT DOCUMENTS

| | | |
|---|---|---|
| 5,424,933 A | 6/1995 | Illingworth |
| 5,926,383 A | 7/1999 | Pilukaitis et al. |
| 6,115,266 A | 9/2000 | Matsui et al. |
| 6,147,883 A | 11/2000 | Balakrishnan et al. |
| 6,185,082 B1 | 2/2001 | Yang |
| 6,233,161 B1 | 5/2001 | Balakrishnan et al. |
| 6,304,462 B1 | 10/2001 | Balakrishnan et al. |
| 6,480,399 B2 | 11/2002 | Balakrishnan et al. |
| 6,580,593 B2 | 6/2003 | Balakrishnan |
| 6,842,353 B2 | 1/2005 | Yamada et al. |
| 6,900,995 B2 | 5/2005 | Muegge et al. |
| 6,972,969 B1 | 12/2005 | Shteynberg et al. |
| 7,099,128 B2 | 8/2006 | Balakrishnan et al. |
| 7,259,972 B2 | 8/2007 | Yang |
| 7,310,247 B1 | 12/2007 | Lin et al. |
| 7,352,595 B2 | 4/2008 | Yang et al. |
| 7,463,497 B2 | 12/2008 | Negrete |
| 7,471,531 B2 | 12/2008 | Blaha et al. |
| 7,486,528 B2 | 2/2009 | Yang |
| 7,502,236 B2 | 3/2009 | Baurle et al. |
| 7,511,978 B2 | 3/2009 | Chen et al. |
| 7,539,028 B2 | 5/2009 | Baurle et al. |
| 7,541,795 B1 | 6/2009 | Smith et al. |
| 7,551,462 B2 | 6/2009 | Uruno et al. |
| 7,609,533 B2 | 10/2009 | Chuang et al. |
| 7,643,322 B1 | 1/2010 | Varga et al. |
| 7,760,518 B2 | 7/2010 | Baurle et al. |
| 8,077,483 B2 | 12/2011 | Djenguerian et al. |
| 8,077,486 B2 | 12/2011 | Djenguerian et al. |
| 8,406,013 B2 | 3/2013 | Djenguerian et al. |
| 8,571,733 B2 | 10/2013 | Yamamoto et al. |
| 8,571,734 B2 | 10/2013 | Yamamoto et al. |
| 8,773,871 B2 | 7/2014 | Djenguerian et al. |
| 9,166,479 B2 | 10/2015 | Djenguerian et al. |
| 9,450,478 B1* | 9/2016 | Djenguerian ......... H02M 1/088 |
| 9,876,433 B2* | 1/2018 | Pregitzer ........... H02M 3/33515 |
| 9,893,630 B2* | 2/2018 | Balakrishnan .... H02M 3/33515 |
| 9,912,242 B2* | 3/2018 | Djenguerian ..... H02M 3/33507 |
| 9,929,656 B2* | 3/2018 | Matthews ......... H02M 3/33523 |
| 9,954,461 B1* | 4/2018 | Duvnjak ............. H02M 7/1626 |
| 10,027,236 B1* | 7/2018 | Gaknoki ........... H02M 3/33592 |
| 10,033,284 B2* | 7/2018 | Werner .................... H02M 1/08 |
| 10,063,152 B2* | 8/2018 | Ryan ................. H02M 3/33507 |
| 2003/0222633 A1 | 12/2003 | Hwang |
| 2004/0095694 A1 | 5/2004 | Balakrishnan et al. |
| 2004/0120171 A1 | 6/2004 | Choi et al. |
| 2005/0269999 A1 | 12/2005 | Liu et al. |
| 2006/0040449 A1 | 2/2006 | Lotfi et al. |
| 2006/0158909 A1 | 7/2006 | Hawley |
| 2007/0002510 A1 | 1/2007 | Baurle et al. |
| 2007/0008749 A1 | 1/2007 | Baurle et al. |
| 2007/0171683 A1 | 7/2007 | Sukup |
| 2007/0291807 A1 | 12/2007 | Uesaka |
| 2008/0012542 A1 | 1/2008 | Liu et al. |
| 2008/0157732 A1 | 7/2008 | Williams |
| 2008/0192514 A1 | 8/2008 | Zhou et al. |
| 2008/0247199 A1 | 10/2008 | Djenguerian et al. |
| 2008/0247202 A1 | 10/2008 | Djenguerian et al. |
| 2012/0039097 A1 | 2/2012 | Djenguerian et al. |
| 2012/0051098 A1 | 3/2012 | Djenguerian et al. |
| 2013/0170251 A1 | 7/2013 | Djenguerian et al. |
| 2014/0307479 A1 | 10/2014 | Djenguerian et al. |
| 2016/0036333 A1 | 2/2016 | Djenguerian et al. |
| 2018/0048238 A1* | 2/2018 | Balakrishnan ........ H02M 3/156 |

FOREIGN PATENT DOCUMENTS

| | | |
|---|---|---|
| CN | 1521930 A | 8/2004 |
| CN | 1728491 A | 2/2006 |
| CN | 2800640 Y | 7/2006 |
| CN | 1885661 A | 12/2006 |
| CN | 1929230 A | 3/2007 |
| EP | 0091133 A1 | 10/1983 |
| EP | 1298778 A2 | 4/2003 |
| EP | 1742337 A2 | 1/2007 |
| EP | 1742341 A2 | 1/2007 |
| EP | 1744442 A2 | 1/2007 |
| JP | 59-103573 | 6/1984 |
| JP | 01-175453 | 7/1989 |
| JP | H11-341791 A | 12/1999 |
| JP | 2002-509417 A | 3/2002 |
| JP | 2002-354795 A | 12/2002 |
| JP | 2005-143155 A | 6/2005 |
| JP | 2005-287248 A | 10/2005 |
| JP | 2006-042573 A | 2/2006 |
| JP | 2007-014196 A | 1/2007 |
| JP | 2007-082394 A | 3/2007 |
| TW | 583819 B | 4/2004 |
| WO | WO 2004/057744 A1 | 7/2004 |

OTHER PUBLICATIONS

Bindra, A., "Power Supply Controller Keeps Efficiency High Across All Loads: Using digital regulation, this power controller yields high performance at low loads with unconditional stability," Analog, Power Devices & DSP, Electronic Design, Dec. 3, 2001, pp. 50-52.

iWatt, "iW2201—Digital SMPS Controller: Preliminary Data," Revision 1.1, no date, pp. 1-13.

iWatt, "iW2202—Digital SMPS Controller: Preliminary Data," Revision 1.0, no date, pp. 1-14.

CN 200810100387.2—Chinese First Office Action with English Translation, dated Nov. 18, 2011 (17 pages).

CN 200810100387.2—Second Chinese Office Action, dated Jul. 24, 2012, with English Translation (8 pages).

CN 200810100341.0—First Chinese Office Action, dated Apr. 12, 2012, with English Translation (9 pages).

JP 2008-099713—Japanese Office Action, dated Apr. 2, 2013, with English Translation (8 pages).

JP 2008-099730—Japanese Office Action, dated Apr. 2, 2013, with English Translation (4 pages).

JP 2008-099713—Second Japanese Office Action, dated Dec. 17, 2013 (2 pages).

JP 2008-099730—Second Japanese Office Action with English Translation, dated Jan. 7, 2014 (7 pages).

CN 201310109189.3—First Chinese Office Action and Search Report, dated Oct. 8, 2014 with English Translation (20 pages).

(56) References Cited

OTHER PUBLICATIONS

CN 201310112451.X—First Chinese Office Action and Search Report, dated Nov. 2, 2014, with English Translation (11 pages).
CN 201310109189.3—Second Chinese Office Action with English Translation, dated Jun. 23, 2015 (6 pages).
EP 08251347.4—Extended European Search Report, dated May 17, 2016, 20 pages.
EP 08251346.6—Extended European Search Report, dated Jul. 1, 2016, 17 pages.
Indian Patent Application No. 793/MUM/2008—Indian Office Action and Search Report, dated Feb. 6, 2017, 9 pages.
Indian Patent Application No. 794/MUM/2008—Indian Office Action, dated May 1, 2017, 7 pages.

* cited by examiner

US 10,177,666 B2

METHOD AND APPARATUS FOR SENSING MULTIPLE VOLTAGE VALUES FROM A SINGLE TERMINAL OF A POWER CONVERTER CONTROLLER

REFERENCE TO PRIOR APPLICATIONS

This application is a continuation of U.S. Non-Provisional application Ser. No. 15/363,744, filed Nov. 29, 2016, now pending, which is a continuation of U.S. Non-Provisional application Ser. No. 14/880,481, filed Oct. 12, 2015, now issued as U.S. Pat. No. 9,543,840, which is a continuation of U.S. Non-Provisional application Ser. No. 14/313,447, filed Jun. 24, 2014, now issued as U.S. Pat. No. 9,166,479, which is a continuation of U.S. Non-Provisional application Ser. No. 13/777,438, filed Feb. 26, 2013, now issued as U.S. Pat. No. 8,773,871, which is a continuation of U.S. Non-Provisional application Ser. No. 13/279,157, filed Oct. 21, 2011, now issued as U.S. Pat. No. 8,406,013, which is a continuation of U.S. Non-Provisional application Ser. No. 12/058,530, filed Mar. 28, 2008, now issued as U.S. Pat. No. 8,077,483, which claims the benefit of U.S. Provisional Application No. 60/922,133, filed Apr. 6, 2007, entitled "METHOD AND APPARATUS FOR SENSING MULTIPLE VOLTAGE VALUES FROM A SINGLE TERMINAL OF A POWER CONVERTER CONTROLLER." U.S. patent application Ser. No. 15/363,744, and 60/922,133, and U.S. Pat. Nos. 9,543,840; 9,166,479; 8,773,871; 8,406,013, and 8,077,483 are hereby incorporated by reference.

BACKGROUND INFORMATION

Field of the Disclosure

The present invention relates generally to power converters, and more specifically, the invention relates to sensing input and output voltages of power converters.

Background

Many electrical devices such as cell phones, personal digital assistants (PDA's), laptops, etc. are powered by a source of relatively low-voltage DC power. Because power is generally delivered through a wall outlet as high-voltage AC power, a device, typically referred to as a power converter is required to transform the high-voltage AC power to low-voltage DC power. The low-voltage DC power may be provided by the power converter directly to the device or it may be used to charge a rechargeable battery that, in turn, provides energy to the device, but which requires charging once stored energy is drained. Typically, the battery is charged with a battery charger that includes a power converter that meets constant current and constant voltage requirements required by the battery. In operation, a power converter may use a controller to regulate output power delivered to an electrical device, such as a battery, that may be generally referred to as a load. More specifically, the controller may be coupled to a sensor that provides feedback information of the output of the power converter in order to regulate power delivered to the load. The controller regulates power to the load by controlling a power switch to turn on and off in response to the feedback information from the sensor to transfer energy pulses to the output from a source of input power such as a power line.

Power converter control circuits may be used for a multitude of purposes and applications. There is a demand for control circuit functionality that can provide all features demanded for the application while reducing the number of components outside the integrated control circuit. This reduction in external component count enables miniaturization of the power converter to improve portability, reduces the number of design cycles required to finalize a power converter design and also improves reliability of the end product. Furthermore, reduced component count can offer energy efficiency improvements in the operation of the power converter and can reduce the power converter cost. Some example additional features that improve on regulation and detect additional fault conditions in the power converter rely on sensing an input line voltage. In some cases, sensing an input line voltage may be necessary in order to meet customer requirements. However, known circuits that sense an input line voltage add components external to the controller. An integrated solution would eliminate discrete components needed to sense the input line voltage, but in some cases integrating a circuit that senses an input line voltage may result in the need for additional terminals, which may increase the size, cost and complexity of the integrated controller.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

DETAILED DESCRIPTION

Examples related to sensing voltages in power converters are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples.

As will be discussed, example integrated controllers for power converters that include a sensing circuit that senses input line voltage and output voltage from the same terminal are disclosed in accordance with the teachings of the present invention. Examples of the disclosed power converters and methods may be used in a variety of applications in which the output voltage is regulated by a controller in response to sensed input line voltage and output voltage.

Figure 1:
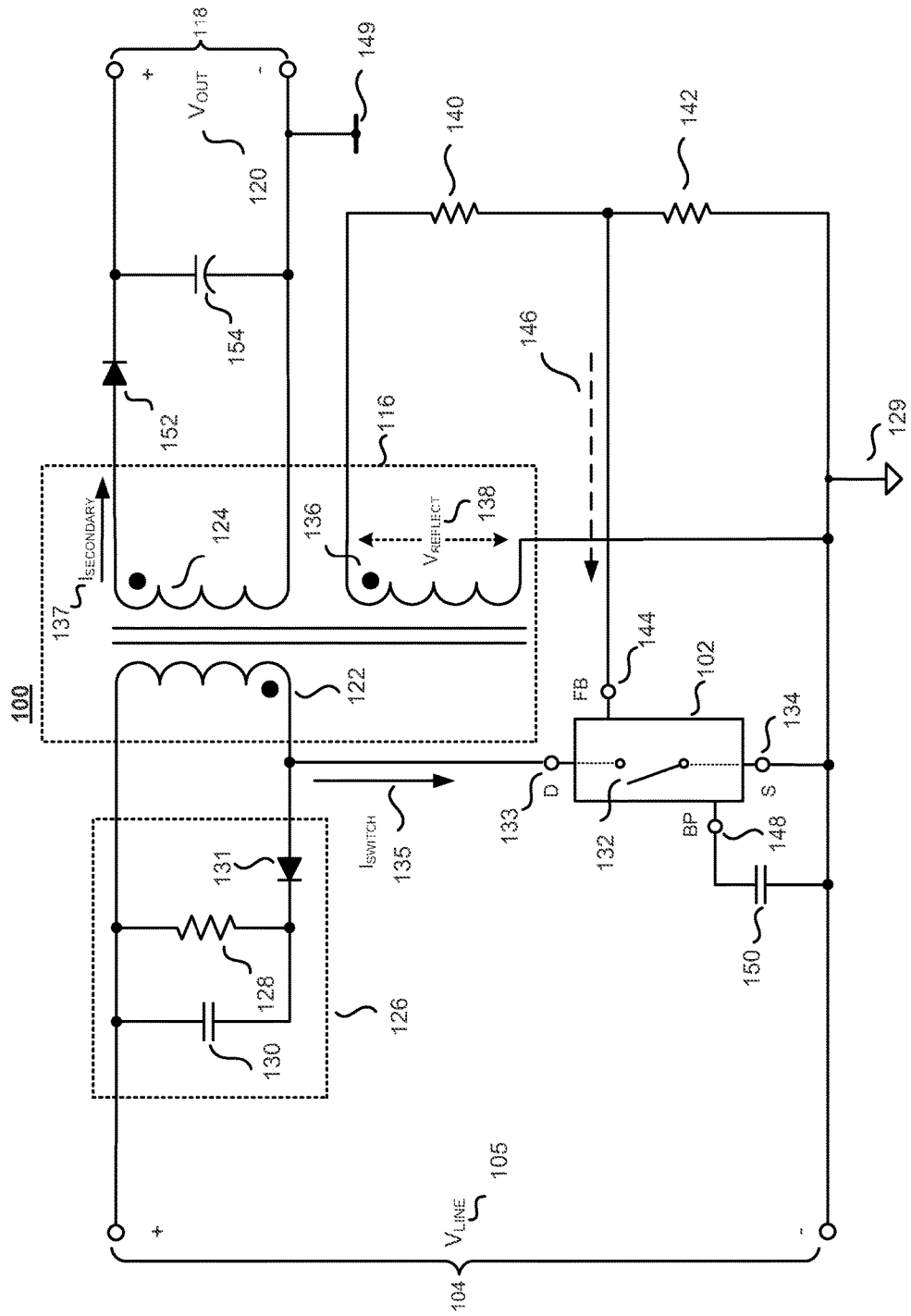
FIG. 1 is a schematic illustrating generally an example power converter including a controller in accordance with the teachings of the present invention.

To illustrate, FIG. 1 is a schematic showing generally an example of a power converter 100, also referred to as a power supply, including a controller 102 in accordance with the teachings of the present invention. In one example, controller 102 may be included in an integrated circuit. As shown, the power supply 100 receives DC current at input 104, which in the illustrated example is coupled to an unregulated input line voltage $V_{LINE}$ 105. An energy transfer element 116 galvanically isolates input 104 from output terminals 118, which in the example corresponds with an output voltage $V_{OUT}$ 120. With input 104 galvanically isolated from output terminals 118 by energy transfer element 116, there is no DC current path to allow current to flow from the input side to the output side of the power converter 100. In one example, energy transfer element 116 includes an input winding 122 and an output winding 124. An "input winding" may also be referred to as a "primary winding" and an "output winding" may also be referred to as a "secondary winding." As shown, a clamp circuit 126 is coupled to input winding 122 of energy transfer element 116 to limit the maximum voltage across controller 102. In one example, the clamp circuit 126 may include a resistor 128, a capacitor 130, and a rectifier 131.

As shown in the depicted example, controller 102 includes power switch 132 coupled between a first terminal 133 and second terminal 134 coupled to an input return 129. In one example, the input return 129 and an output return 149 may be coupled.

In one example, first terminal 133 may be referred to as a "drain terminal" and second terminal 134 may be referred to as a "source terminal." Power switch 132 is coupled to control the transfer of energy through the energy transfer element 116 from input terminals 104 to the output terminals 118 to regulate an output of power supply 100 by switching the power switch 132 between an on state and an off state. More specifically, when power switch 132 is on, a switch current $I_{SWITCH}$ 135 flows through the input winding 122 and when power switch 132 is off, switch current $I_{SWITCH}$ 135 is substantially prevented from flowing through power switch 132. In one example, power switch 132 is a transistor, such as for example a high voltage metal oxide semiconductor field effect transistor (MOSFET). It is noted in the example illustrated in FIG. 1, power switch 132 is included within controller 102. For instance, in one example, controller 102 is a monolithic integrated circuit including power switch 132. In another example, however, power switch 132 may instead be a discrete external device coupled to and controlled by controller 102 or may be a discrete switch packaged with an integrated controller in a hybrid device. In other various examples, controller 102 may include features to employ any of a variety of control methods including, but not limited to, ON/OFF control, ON/OFF control with varying current limit levels, pulse width modulation (PWM), or the like.

As shown, the energy transfer element 116 further includes an auxiliary winding 136 that provides a reflected voltage $V_{REFLECT}$ 138, which may be representative of input line voltage $V_{LINE}$ 105 when switch current $I_{SWITCH}$ 135 is flowing through input winding, and representative of output voltage $V_{OUT}$ 120 when a secondary current $I_{SECONDARY}$ 137 is flowing through output winding 124. In one example, reflected voltage $V_{REFLECT}$ 138 may be representative of an input line voltage $V_{LINE}$ 105 during at least a portion of the time of when the power switch 132 is on, and representative of output voltage $V_{OUT}$ 120 during at least a portion of the time when the power switch 132 is off. In operation, when the power switch 132 is on, switch current $I_{SWITCH}$ 135 is enabled to flow through the input winding 122 allowing for the reflected voltage $V_{REFLECT}$ 138 to represent a voltage that is proportional to the input line voltage $V_{LINE}$ 105. The reflected voltage $V_{REFLECT}$ 138 may be proportional to the input line voltage $V_{LINE}$ 105 by the same proportion of the number of turns in auxiliary winding 136 to number of turns in input winding 122. An example relationship that exists between the turns ratio and voltage ratio is shown below:

$$\frac{V_{REFLECT}}{V_{LINE}} = \frac{N_A}{N_I} \quad (1)$$

where $N_A$ is the number of turns on auxiliary winding 136 and $N_I$ is the number of turns on input winding 122. When power switch 132 transitions from an on state to an off state, switch current $I_{SWITCH}$ 135 is substantially prevented from flowing through power switch 132 and the energy stored in input winding 122 is transferred to output winding 124 allowing the reflected voltage $V_{REFLECT}$ 138 to represent a voltage that is proportional to the output voltage $V_{OUT}$ 120. The reflected voltage $V_{REFLECT}$ 138 may be proportional to the output voltage $V_{OUT}$ 120 by the same proportion of the number of turns in auxiliary winding 136 to the number of turns in output winding 124. An example relationship that may exist between the turns ratio and the voltage ratio is shown below:

$$\frac{V_{REFLECT}}{V_{OUT} + V_F} = \frac{N_A}{N_O} \quad (2)$$

where $N_A$ is the number of turns on auxiliary winding 136, $N_O$ is the number of turns on output winding 124, and $V_F$ is the voltage across the rectifier 152 when it is forward biased. When $V_F$ is negligible with respect to $V_{OUT}$, the expression may be simplified to $$\frac{V_{REFLECT}}{V_{OUT}} \approx \frac{N_A}{N_O} \quad (3)$$

Continuing with the example shown in FIG. 1, auxiliary winding 136 is coupled to a voltage divider that includes first and second resistors 140 and 142 such that a feedback terminal 144 is coupled to a node between first and second resistors 140 and 142. In one example, values for first and second resistors 140 and 142 may be chosen based on the desired output voltage $V_{OUT}$ 120. A feedback signal 146 is received by controller 102 and is representative of the reflected input line voltage when power switch 132 is on, and representative of the reflected output line voltage when power switch 132 is off. As shown, a bypass terminal 148 is coupled to a bypass capacitor 150, which provides supply current to the internal circuitry of controller 102 during operation. In operation, controller 102 produces pulsating currents in the rectifier 152, which in the illustrated example includes a diode that is filtered by capacitor 154 to produce the substantially constant output voltage $V_{OUT}$ 120.

Figure 2:
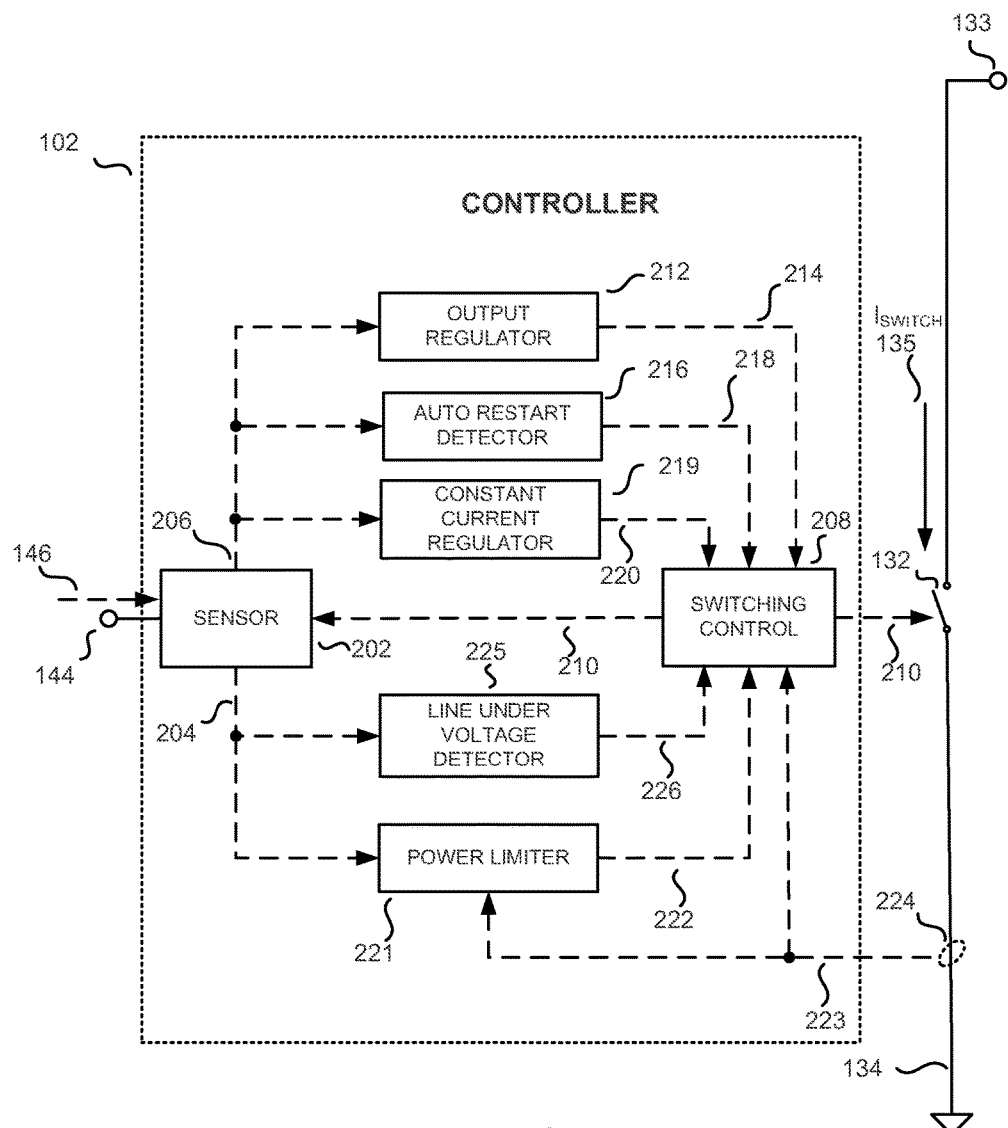
FIG. 2 is a functional block diagram illustrating generally an example controller in accordance with the teachings of the present invention.

FIG. 2 is a functional block diagram further illustrating example controller 102 of FIG. 1 in accordance with the teachings of the present invention. As shown, a sensor 202 outputs a sample input line voltage signal 204 and a sample output voltage signal 206 in response to feedback signal 146. More specifically, when power switch 132 is on, feedback signal 146 provides forward information representative of input line voltage $V_{LINE}$ 105, and when power switch 132 is off feedback signal 146 provides feedback information representative of output voltage $V_{OUT}$ 120. Accordingly, sensor 202 outputs sample input line voltage signal 204 when the feedback signal 146 is representative of the input line voltage $V_{LINE}$ 105, and outputs sample output voltage signal 206 when feedback signal 146 is representative of the output voltage $V_{OUT}$ 120. As shown, a switching control block 208 outputs a drive signal 210 that switches the power switch 132 between an on state and an off state. Drive signal 210 is also output to sensor 202 to determine the timing of when sensor 202 senses the reflected voltage $V_{REFLECT}$ 138 or when sensor 202 senses the input line voltage $V_{LINE}$ 105.

Example functions that may optionally respond to the outputs of the sensor 202 will now be described. An output regulator 212 outputs an output regulation signal 214 in response to the sample output voltage signal 206. More specifically, output regulator 212 employs a particular control technique to regulate output voltage $V_{OUT}$ 120 in response to the sample output voltage signal. For example, a control technique may include ON/OFF control, pulse width modulation, or the like.

As shown in the depicted example, an optional auto restart detector 216 selectively outputs an auto restart signal 218 to indicate switching control block 208 to engage in an auto restart mode. More specifically, auto restart is a mode of operation entered by controller 102 during a fault condition such as, but not limited to, output overload, output short circuit, an open loop condition or the like. For instance, in one example, an auto restart mode is engaged when output voltage $V_{OUT}$ 120 is below a certain threshold voltage for a certain time. When controller 102 is operating in auto restart mode, the power supply 100 operates at a reduced output voltage and reduced average output current to avoid damage from a fault condition. During the auto restart mode, switching is unregulated for a duration that would be long enough to raise the output voltage $V_{OUT}$ 120 above an auto-restart threshold if the load were within specifications, followed by a relatively long interval of no switching if the output does not reach the threshold during the allowed duration of the switching. The auto restart mode repeats this pattern of switching followed by an interval of no switching without manual intervention until the output voltage $V_{OUT}$ 120 reaches the auto-restart threshold.

As shown in the depicted example, an optional constant current regulator 219 outputs a constant current signal 220 to switching control block 208 in response to sampled output voltage signal 206. More specifically, when power converter 100 is in a current regulation mode, the switching control block 208 regulates output current at output terminals 118.

As shown, an optional power limiter 221 is also included and is coupled to receive sample input line voltage 204 and a current sense signal 223. Power limiter 221 outputs a power limit signal 222 to switching control block 208. In particular, the power limiter 221 limits input power to the power supply 100 in response to the sample input line voltage signal 204 and a current sense signal 223 from a current sensor 224. In one example, the current sense signal 223 is generated in response to a sensing of switch current $I_{SWITCH}$ 135 in power switch 132. Any of the many know ways to measure switch current $I_{SWITCH}$ 135, such as for example a current transformer, or the voltage across a discrete resistor, or the voltage across a transistor when the transistor is conducting, may be implemented with current sensor 224. In the illustrated example, current sensor 224 is coupled to power switch 132 at a node between power switch 132 and source terminal 134. In another example, it is appreciated that current sensor 224 may be coupled at a node between power switch 132 and drain terminal 133 in accordance with the teachings of the present invention.

As shown in the example, an optional line under voltage detector 225 is also coupled to receive sample input line voltage signal 204 and is coupled to output a line under voltage signal 226 to switching control block 208. More specifically, the line under voltage detector 225 determines when the line voltage $V_{LINE}$ 105 is under a line voltage threshold in response to sample input line voltage signal 204.

Figure 3:
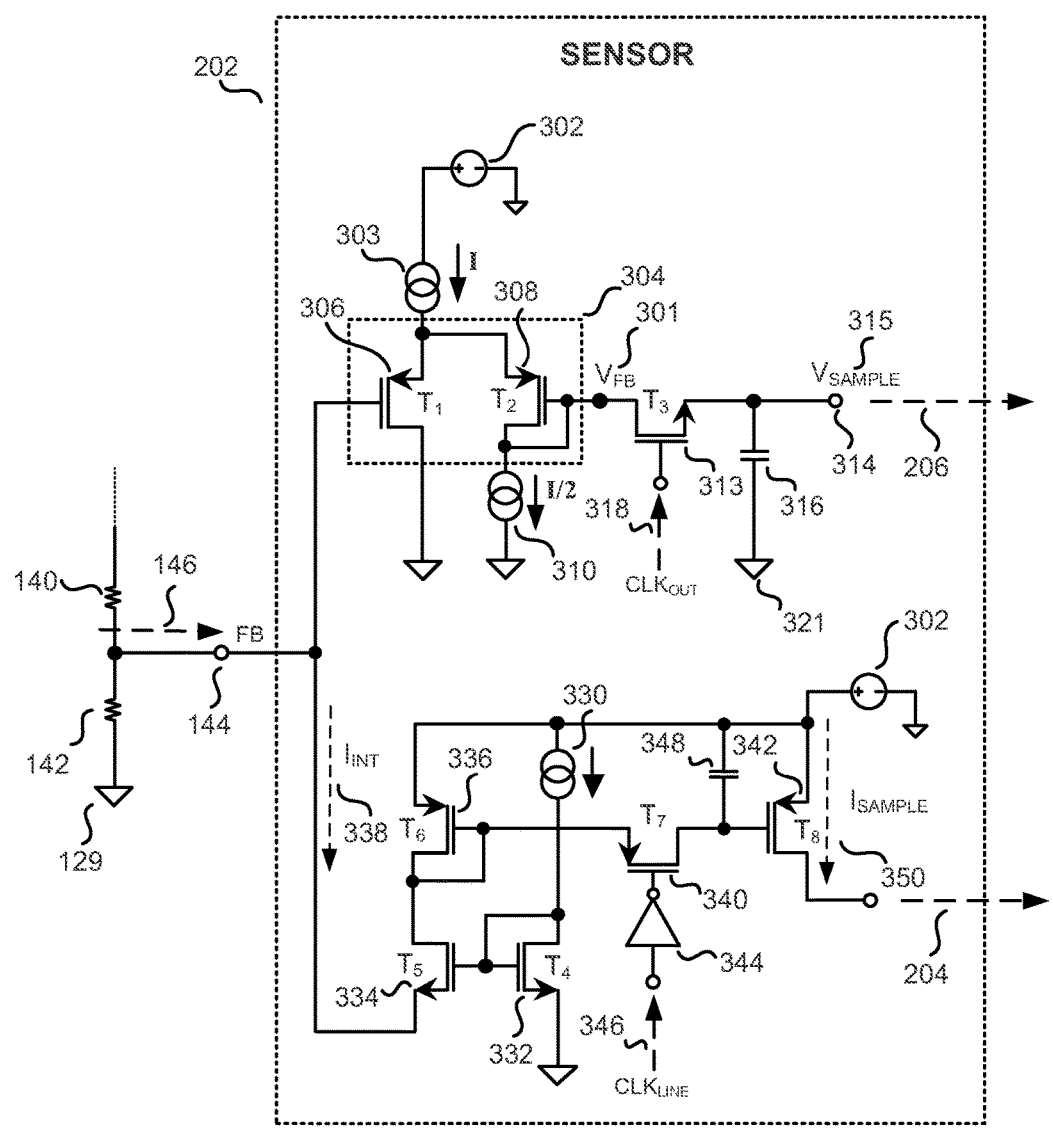
FIG. 3 is a schematic illustrating an example sensor in accordance with the teachings of the present invention.
Figure 4:
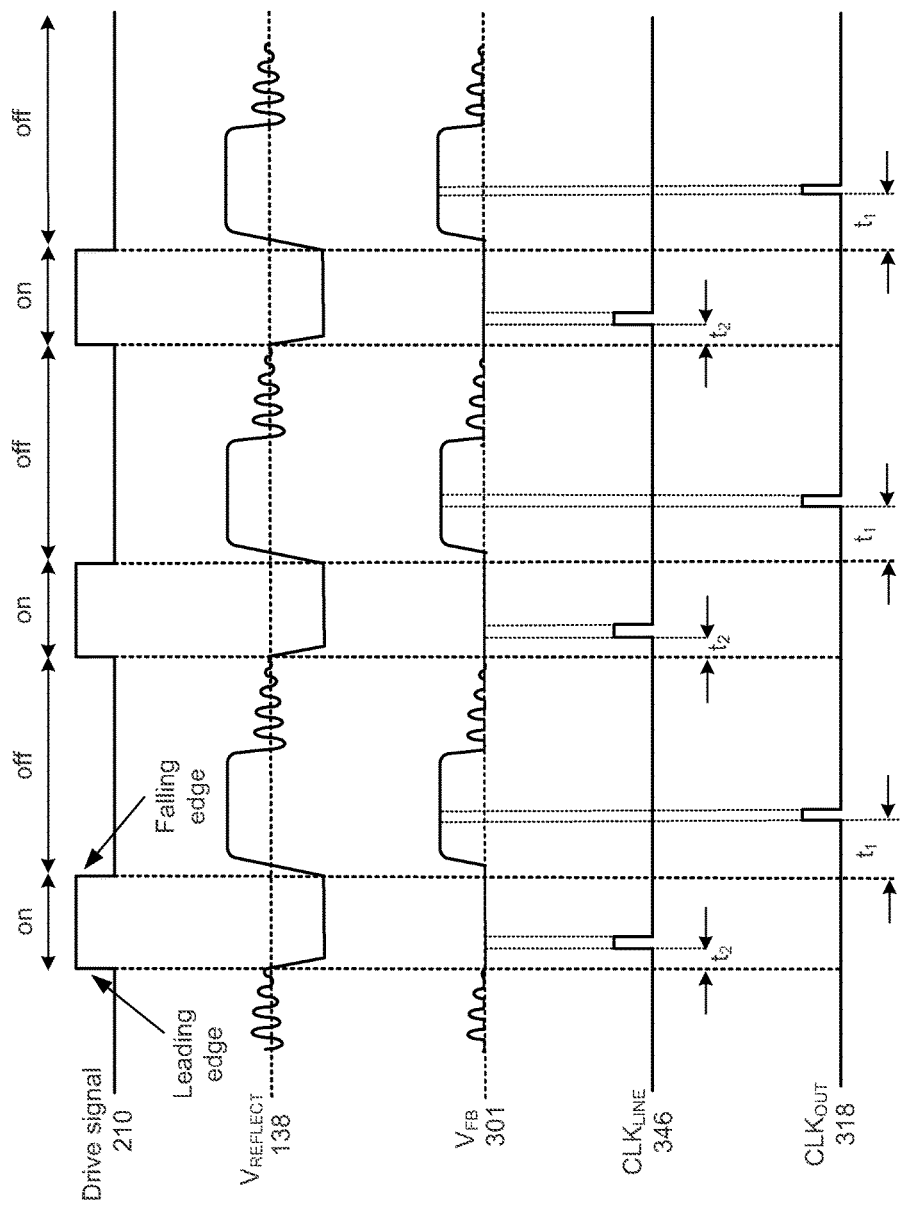
FIG. 4 illustrates generally example voltage waveforms and clock signals associated with an example sensor in accordance with the teachings of the present invention.

FIG. 3 is a schematic 300 illustrating an example of sensor 202 in accordance with the teachings of the present invention. As shown, feedback terminal 144 is coupled to provide feedback signal 146 to sensor 202. As illustrated in FIG. 4, during at least a portion of when drive signal 210 is low, which in one example represents an off state for power switch 132, feedback voltage $V_{FB}$ at feedback terminal 144 is representative of an output voltage $V_{OUT}$ 120. During at least a portion of when drive signal 210 is high, which in one example represents an on state for power switch 132, feedback terminal is clamped to zero volts with respect to input return 129. In another example, it is appreciated that drive signal 210 may be high to represent an off state for power switch 132.

Continuing with the example of FIG. 3, schematic 300 illustrates a sensor coupled to receive feedback signal 146 to generate a sample output voltage signal 206 and a sample input line voltage signal 204. An internal voltage supply 302 is coupled to a first current source 303 that supplies current to a buffer circuit 304 that includes matched p-channel transistors $T_1$ 306 and $T_2$ 308. As used herein, a transistor may be an n-channel or p-channel transistor. N-channel and p-channel transistors perform complementary or opposite functions, such that a signal that causes an n-channel transistor to turn on will cause a p-channel transistor to turn off. For analog signals, a signal that causes an n-channel transistor to conduct more current will cause a p-channel transistor to conduct less current. An n-channel transistor requires a positive voltage between the gate and source for the transistor to conduct current. A p-channel transistor requires a negative voltage between the gate and source for the transistor to conduct current. An n-channel transistor substantially prevents current flow through the n-channel transistor when the positive voltage between the gate and source of the n-channel transistor is less than the transistor's threshold voltage. As the voltage between the gate and source of the n-channel transistor becomes greater than the transistor's threshold voltage, more current is permitted to flow through the n-channel transistor. Conversely, the p-channel transistor substantially prevents current flow through the p-channel transistor when the negative voltage between the gate and source of the p-channel transistor is less negative (closer to zero) than the transistor's negative threshold voltage. As the negative voltage between the gate and source of the p-channel transistor becomes more negative than the transistor's negative threshold voltage, more current is permitted to flow through the p-channel transistor.

A second current source 310 is coupled to sink current from transistor $T_2$ 308. In operation, the voltage at the gate of transistor $T_1$ 306 is equal to the voltage at feedback terminal 144 with respect to input return 129. With the configuration of matched transistors $T_1$ 306 and $T_2$ 308 in the illustrated example, the voltage at the gate of transistor $T_2$ 308 is substantially equal to voltage at feedback terminal 144 with respect to input return 129. As shown, an n-channel transistor $T_3$ 313 is coupled between the gate of transistor $T_2$ 308 and a voltage terminal 314, which corresponds to a sampled output voltage $V_{SAMPLE}$ 315 with respect to an input return 321.

In operation, sample output voltage signal 206 is representative of sampled output voltage $V_{SAMPLE}$ 315 with respect to input return 321. As shown, a capacitor 316 is coupled to voltage terminal 314 such that when an output clock signal $CLK_{OUT}$ 318 is high, transistor $T_3$ 313 is on and allows current to flow to and from capacitor 316 to readjust sampled output voltage $V_{SAMPLE}$ 315 to match the voltage at feedback terminal 144. When output clock signal $CLK_{OUT}$ 318 is low, transistor $T_3$ 313 is 'off' and capacitor 316 is prevented from charging or discharging. In another example, it is appreciated that transistor $T_3$ 313 could be designed to be on when $CLK_{OUT}$ 318 is low and $T_3$ 313 could be designed to be off when $CLK_{OUT}$ 318 is high. The output clock signal $CLK_{OUT}$ 318 is derived from drive signal 210. As shown in FIG. 4, output clock signal $CLK_{OUT}$ 318 is a pulsed signal that pulses after a time $t_1$ after the falling edge of drive signal 210. In other words, output clock signal $CLK_{OUT}$ 318 is a pulsed signal that pulses after a time $t_1$ after power switch 132 transitions from an on state to an off state.

Referring back to the example shown in FIG. 3, sampled output voltage $V_{SAMPLE}$ 315 is adjusted to the voltage at feedback terminal 144 while output clock signal $CLK_{OUT}$ 318 is high. More specifically, the pulse of output clock signal $CLK_{OUT}$ 318 is high for a duration of time that allows capacitor 316 to charge or discharge to the voltage at feedback terminal 144 with respect to input return 129. In the example, output sample voltage $V_{SAMPLE}$ 315 is adjusted after the time delay $t_1$, which is during the time period wherein reflected voltage $V_{REFLECT}$ 138 is representative of output voltage $V_{OUT}$ 120.

Referring back to the example sensor 202 in FIG. 3, the internal voltage supply 302 is coupled to a third current source 330 that supplies current to n-channel transistor $T_4$ 332. As shown, gate of transistor $T_4$ 332 is coupled to gate of n-channel transistor $T_5$ 334. A p-channel transistor $T_6$ 336 is coupled between internal voltage supply 302 and transistor $T_5$ 334. As shown in FIG. 4, when the reflected voltage $V_{REFLECT}$ 138 is below zero, the feedback terminal with respect to input return 129 is clamped to approximately zero volts and a negative internal current $I_{INT}$ 338 representative of the input line voltage $V_{LINE}$ 105 flows through from auxiliary winding 136 through transistors $T_6$ 336 and $T_5$ 334. In one example, the internal current $I_{INT}$ 338 may change in magnitude in response to the reflected voltage $V_{REFLECT}$ 138.

As shown in the depicted example, a p-channel transistor 340 $T_7$ is coupled between the gate of transistor $T_6$ 336 and the gate of a transistor $T_8$ 342. A capacitor 348 is coupled between the internal voltage supply 302 and the gate of p-channel transistor $T_8$ 342. As shown, an output of an inverter 344 is coupled to the gate of transistor $T_7$ 340. The input of the inverter 344 is coupled to receive an input line clock signal $CLK_{LINE}$ 346. As shown in FIG. 4, input line clock signal $CLK_{LINE}$ 346 is a pulsed signal that pulses after a time $t_2$ after the leading edge of drive signal 210. In other words, input line clock signal $CLK_{LINE}$ 346 is a pulsed signal that pulses after a time $t_2$ after a power switch 132 transitions from an off state to an on state.

Referring back to FIG. 3, when input line clock signal $CLK_{LINE}$ 346 is high, transistor $T_7$ 340 is on and allows current to flow to and from capacitor 348 to adjust the voltage at the gate of transistor $T_8$ 342 to match the voltage at the gate of transistor $T_6$ 336. More specifically, the pulse of input line clock signal $CLK_{LINE}$ 346 is high for a duration of time that allows capacitor 348 to charge or discharge to the voltage at the gate of transistor $T_6$ 336 with respect to input return 129. The voltage at the gate of transistor $T_6$ 336 is determined by the magnitude of internal current $I_{INT}$ 338. When input line clock signal $CLK_{LINE}$ 346 is low, transistor $T_7$ 340 is off and substantially prevents current from flowing to and from capacitor 348. In another example, it is appreciated that transistor $T_7$ 340 could be designed to be on when $CLK_{LINE}$ 346 is low and $T_7$ 340 could be designed to be off when $CLK_{LINE}$ 346 is high. Since voltage at the gate of transistor $T_6$ 336 is substantially equal to the voltage at the gate of transistor 342 $T_8$, a sample current $I_{SAMPLE}$ 350 proportional to internal current $I_{INT}$ 338 will flow through transistor 342 $T_8$ when transistor 340 $T_7$ is on. More specifically, the proportionality of the current $I_{INT}$ 338 to current $I_{SAMPLE}$ 350 is based on the proportionality of the sizing of transistor $T_6$ 336 to transistor $T_8$ 342 in the illustrated example. In operation, $I_{SAMPLE}$ 350 may be converted into a voltage value by using a resistive element such as, but not limited to, a resistor and is representative of sample input line voltage signal 204.

Referring back to FIG. 4, the clock signal $CLK_{LINE}$ 346 is high after a time delay $t_2$ after the power switch 132 turns on. Since auxiliary winding 136 may not necessarily reflect input voltage accurately immediately after power switch 132 turns on, a time delay $t_2$ occurs before $I_{SAMPLE}$ 350 is adjusted proportionately to internal current $I_{INT}$ 338.

Figure 5:
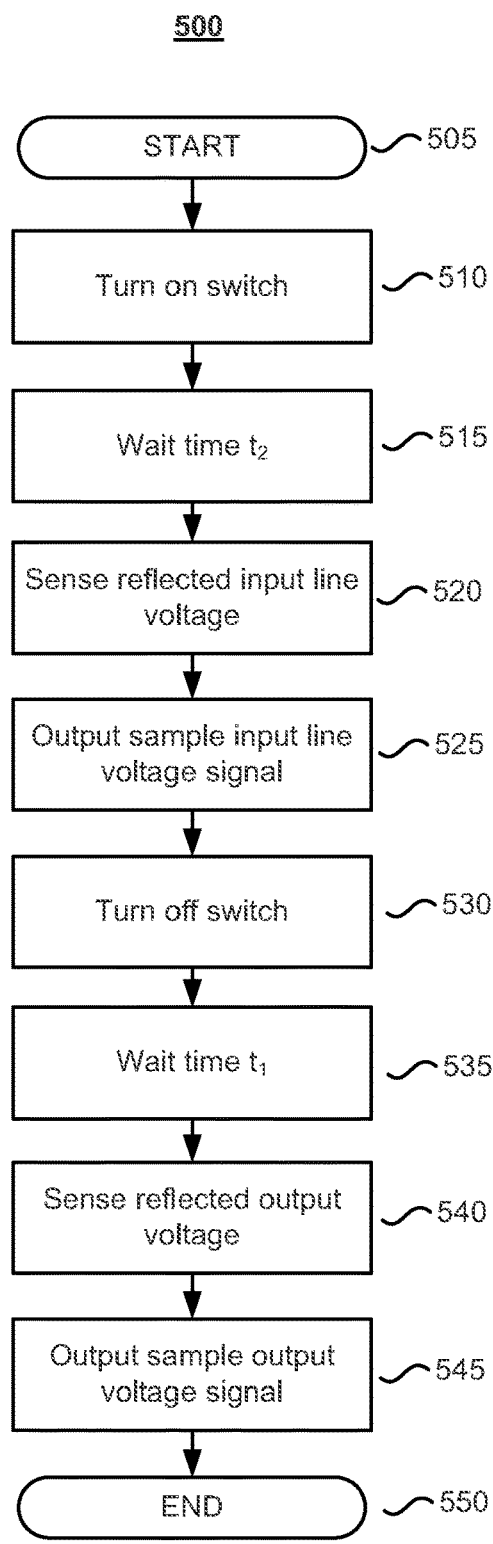
FIG. 5 is a flow chart illustrating generally an example a method for sensing an output voltage and an input line voltage on the same terminal in accordance with the teachings of the present invention.

FIG. 5 is a flow chart 500 illustrating generally an example method for sensing an output voltage and a line voltage on the same terminal of an integrated power supply controller in accordance with the teachings of the present invention. Processing begins at block 505, and in block 510, power switch 132 is turned on. In block 515, a time delay $t_2$ occurs before sensing reflected input line voltage in block 520. In block 525, the sample input line voltage signal 204 is output. In block 530, the power switch 132 is turned off. In block 535, a time delay $t_1$ occurs before sensing reflected output line voltage in block 540. In block 545, the sample output voltage signal 206 is output and processing is complete in block 550.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method for regulating an output of a power converter, comprising:
receiving a signal from an auxiliary winding of an energy transfer element of the power converter, wherein the energy transfer element includes an input winding coupled to an input of the power converter, an output winding coupled to the output of the power converter, and the auxiliary winding, wherein the signal represents a line input voltage of the power converter during at least a portion of an on time of a power switch coupled to the input winding, and wherein the signal represents an output voltage of the power converter during at least a portion of an off time of the power switch;
sampling the signal during the portion of the off time of the power switch;
generating a sample output voltage signal;
sampling the signal during the portion of the on time of the power switch;
generating a sample input line voltage signal; and
switching the power switch in response to the sample output voltage signal and the sample input line voltage signal to regulate the output of the power converter.

2. The method of claim 1, further comprising clamping a voltage of the signal during at least the portion of the on time of the power switch.

3. The method of claim 1, further comprising:
generating a power limit signal in response to the sample input line voltage signal; and
using the power limit signal to limit an input power of the power converter.

4. The method of claim 1, further comprising responding to the sample output voltage signal by placing the controller into an auto restart mode.

* * * * *